US 9,963,092 B2

(12) United States Patent
Uno

(10) Patent No.: US 9,963,092 B2
(45) Date of Patent: May 8, 2018

(54) ELECTRICAL WIRE ROUTING APPARATUS

(71) Applicant: Sumitomo Wiring Systems, Ltd., Yokkaichi, Mie (JP)

(72) Inventor: Hiroki Uno, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days. days.

(21) Appl. No.: 15/289,240

(22) Filed: Oct. 10, 2016

(65) Prior Publication Data

US 2017/0104318 A1    Apr. 13, 2017

(30) Foreign Application Priority Data

Oct. 13, 2015  (JP) ................................ 2015-201857

(51) Int. Cl.
| | |
|---|---|
| B60R 16/02 | (2006.01) |
| H02G 3/04 | (2006.01) |
| H02G 11/00 | (2006.01) |
| F16L 3/015 | (2006.01) |

(52) U.S. Cl.
CPC .......... *B60R 16/0215* (2013.01); *B60R 16/02* (2013.01); *F16L 3/015* (2013.01); *H02G 3/0406* (2013.01); *H02G 3/0468* (2013.01); *H02G 3/0475* (2013.01); *H02G 3/0481* (2013.01); *H02G 3/0487* (2013.01); *H02G 11/003* (2013.01)

(58) Field of Classification Search
CPC .. H02G 3/0406; H02G 3/0468; H02G 3/0475; H02G 3/0487; H02G 3/0481; H02G 11/003; B60R 16/02; B60R 16/0215; F16L 3/015

See application file for complete search history.

(56) References Cited

U.S. PATENT DOCUMENTS

| | | | | |
|---|---|---|---|---|
| 4,384,594 | A  * | 5/1983 | Moritz | .................... F16L 3/015 |
| | | | | 138/120 |
| 6,213,674 | B1 * | 4/2001 | Sasaki | ..................... F16C 1/265 |
| | | | | 384/208 |
| 6,595,473 | B2 * | 7/2003 | Aoki | ......................... F16L 3/10 |
| | | | | 138/108 |
| 6,717,055 | B2 * | 4/2004 | Kato | ................... B60R 16/0215 |
| | | | | 173/136 |

(Continued)

FOREIGN PATENT DOCUMENTS

| | | | | |
|---|---|---|---|---|
| DE | 102009008625 | A1 * | 9/2010 | .............. F16L 3/015 |
| JP | 2006015981 | A  * | 1/2006 | ......... B60R 16/0215 |

(Continued)

*Primary Examiner* — Eret C McNichols
(74) *Attorney, Agent, or Firm* — Reising Ethington, P.C.

(57) ABSTRACT

An electrical wire routing apparatus with high reliability of a motion returning to the original state after being trampled on. The electrical wire routing apparatus includes an electrical wire guide into which an electrical wire routed between a vehicle body and a movable body such as a slide door is insertable and that interlocks with a motion of the slide door, a stretchable elastic member that is installed between the electrical wire guide and the vehicle body, between the electrical wire guide and the slide door, or partway through the electrical wire guide, and a bracket for guiding a displacement motion of the electrical wire guide when the elastic member stretches or shrinks.

6 Claims, 8 Drawing Sheets

(56) References Cited

U.S. PATENT DOCUMENTS

| | | | | |
|---|---|---|---|---|
| 6,830,225 B2 * | 12/2004 | Kato | ................... | B60R 16/0215 248/49 |
| 6,984,782 B2 * | 1/2006 | Ikeda | ...................... | F16G 13/16 174/21 JS |
| 7,109,421 B2 * | 9/2006 | Sekino | ................ | B60R 16/0215 174/71 R |
| 7,151,224 B2 * | 12/2006 | Kogure | ............... | B60R 16/0215 174/71 R |
| 7,297,871 B2 * | 11/2007 | Watanabe | ........... | B60R 16/0215 174/135 |
| 7,392,650 B2 * | 7/2008 | Utaki | ...................... | F16G 13/16 248/49 |
| 7,493,750 B2 * | 2/2009 | Komiya | .................. | F16G 13/16 248/49 |
| 7,513,096 B2 * | 4/2009 | Utaki | ...................... | F16G 13/16 248/49 |
| 7,645,938 B2 * | 1/2010 | Kogure | ............... | B60R 16/0215 174/68.1 |
| 7,861,508 B2 * | 1/2011 | Murayama | .......... | B60R 16/0215 114/364 |
| 7,901,240 B2 * | 3/2011 | Jackson | .............. | H01R 4/5025 439/465 |
| 8,070,212 B2 * | 12/2011 | Shima | ................ | B60R 16/0207 296/146.9 |
| 8,247,694 B2 * | 8/2012 | Sekino | ................ | B60R 16/0215 16/221 |
| 8,316,520 B2 * | 11/2012 | Bedoe | ................ | B60R 16/0215 29/33 M |
| 8,549,831 B2 * | 10/2013 | Dunham | ................. | F16G 13/16 248/49 |
| 8,802,986 B2 * | 8/2014 | Satou | ................... | B60R 16/0207 174/68.1 |
| 8,847,073 B2 * | 9/2014 | Tokunaga | ........... | B60R 16/0215 174/68.1 |
| 9,150,168 B2 * | 10/2015 | Inoue | ................... | H02G 11/006 |
| 9,585,468 B2 * | 3/2017 | Udagawa | .............. | H02G 3/0487 |
| 9,701,262 B2 * | 7/2017 | Sekino | ................ | H02G 11/006 |
| 2005/0264033 A1 * | 12/2005 | Aoki | ................... | B60R 16/0215 296/155 |
| 2007/0107926 A1 * | 5/2007 | Nishijima | ............ | H02G 11/006 174/72 A |
| 2007/0148994 A1 * | 6/2007 | Sato | .................... | B60R 16/0215 439/34 |
| 2008/0142260 A1 * | 6/2008 | Yamaguchi | ........... | B60N 2/0224 174/72 A |
| 2008/0210828 A1 * | 9/2008 | Kogure | ................ | H02G 11/006 248/65 |
| 2014/0306522 A1 * | 10/2014 | Nagayasu | ........... | B60R 16/0215 307/10.1 |
| 2015/0014017 A1 * | 1/2015 | Sugimoto | ............ | H02G 3/0468 174/68.3 |
| 2015/0360629 A1 * | 12/2015 | Sekino | ................ | B60R 16/0215 174/68.3 |
| 2016/0348757 A1 * | 12/2016 | Jaeker | ..................... | F16G 13/16 |
| 2017/0005461 A1 * | 1/2017 | Hartwig | ................ | E05D 15/101 |
| 2017/0040090 A1 * | 2/2017 | DePompeo | .......... | H01B 7/0045 |
| 2017/0066393 A1 * | 3/2017 | Inoue | ................... | B60R 16/0215 |
| 2017/0072878 A1 * | 3/2017 | Mochizuki | .............. | F16L 11/11 |
| 2017/0117691 A1 * | 4/2017 | Hagi | .................... | B60R 16/0215 |

FOREIGN PATENT DOCUMENTS

| | | | | |
|---|---|---|---|---|
| JP | 2008143235 A | * | 6/2008 | ......... B60R 16/0215 |
| JP | 2013151250 A | | 8/2013 | |

* cited by examiner

ELECTRICAL WIRE ROUTING APPARATUS

This application claims the benefit of Japanese Application No. JP2015-201857, filed on Oct. 13, 2015, the contents of which are hereby incorporated by reference in their entirety.

FIELD

The present invention relates to an electrical wire routing apparatus.

BACKGROUND

JP 2013-151250A (Patent Document 1) discloses a wire harness routing apparatus including a cable guide (electrical wire guide) into which a wire harness that is to be routed between a vehicle body and a slide door is inserted. The cable guide has a structure in which a plurality of linking members are rotatably linked. An end linking member of the cable guide and an middle linking member adjacent to the end linking member are capable of being mutually separated from each other, and the end linking member and the middle linking member are linked in a state in which they are always capable of rotating due to an elastic force of a linking belt extending from a protecting tube.

Here, when the cable guide is trampled on, the linking belt extends and the end linking member and the middle linking member are separated from each other. Thus, no excessive stress is applied to a location at which the cable guide is trampled on, preventing the cable guide from being damaged.

Incidentally, the end linking member and the middle linking member that have been separated from each other can come close to each other again due to an elastic restoring force of the linking belt in response to the stop of trampling, and return to the original linked state. However, it is not easy for the end linking member and the middle linking member that have been separated once to return to the original linked state, and it is necessary to correct shifts in the linking position.

The present design has been accomplished based on the above-described circumstances, and an object of the present invention is to provide an electrical wire routing apparatus with high reliability of a motion returning to the original state after being trampled on.

SUMMARY

An electrical wire routing apparatus includes an electrical wire guide into which an electrical wire to be routed between a vehicle body and a movable body that is movable with respect to the vehicle body is insertable, the electrical wire guide being configured to undergo bending displacement in accordance with a motion of the movable body, a stretchable elastic member that is installed between the electrical wire guide and the vehicle body, between the electrical wire guide and the movable body, or partway through the electrical wire guide, and a bracket for guiding a displacement motion of the electrical wire guide when the elastic member stretches or shrinks.

If the electrical wire guide is trampled on, the elastic member extends, and thus a stress is not concentrated on a portion of the electrical wire guide, preventing the electrical wire guide from being damaged. When trampling stops, the electrical wire guide can automatically return to the original state due to the electrical wire guide being guided by the bracket while receiving an elastic restoring force of the elastic member, and thus the reliability of a returning motion can be increased.

DRAWINGS

DESCRIPTION

A preferable embodiment will be described below.

The elastic member may be a rubber member for covering the electrical wire. According to this, the material and the shape of the elastic member can be selected flexibly, and thus the stability of stretching and shrinking motions of an elastic member can be ensured.

The bracket may be provided on the vehicle body or the movable body, one end of the elastic member is linked to the bracket, and the other end of the elastic member is linked to a terminal linking member provided at an end of the electrical wire guide. According to this, because the elastic member is disposed near a site that is easily trampled on, an excessive stress is unlikely to be applied to a portion of the electrical wire guide, reliably preventing the electrical wire guide from being damaged.

A guide surface may be provided on the bracket, the guide surface being inclined downwardly, with respect to the vehicle body, from the vehicle body or the movable body and being capable of supporting the terminal linking member inclined downwardly with respect to the vehicle body. When the electrical wire guide is trampled on, a displacement motion of the electrical wire guide is guided smoothly by the terminal linking member inclined downwardly with respect to the vehicle body being supported by the guide surface.

An engagement protrusion may be provided on one of the bracket and the terminal linking member, and an engagement receiving portion may be provided on the other of the bracket and the terminal linking member. With respect to the vehicle body, the engagement protrusion and the engagement receiving portion may be configured to be always engaged with each other and keep the elastic member in a shrunk state, whereas the engagement protrusion and the engagement receiving portion may be configured to release mutual engagement due to the terminal linking member being inclined along the guide surface and keep the elastic member in a stretched state. According to this, a gap between the bracket and the terminal linking member can be always held in a given positional relationship due to the effect of engagement between the engagement protrusion and the engagement receiving portion. On the other hand, when the electrical wire guide is trampled on, engagement between the engagement protrusion and the engagement receiving portion can be released without any hindrance by utilizing the inclination of a guide surface.

The terminal linking member and the engagement protrusion may have slope portions that slide mutually when the terminal linking member is inclined along the guide surface. According to this, the terminal linking member can smoothly slide the engagement protrusion.

Figure 7:
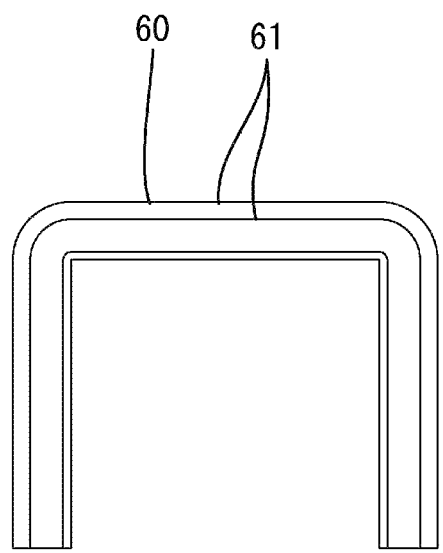
FIG. 7 is a front view of the elastic member.
Figure 8:
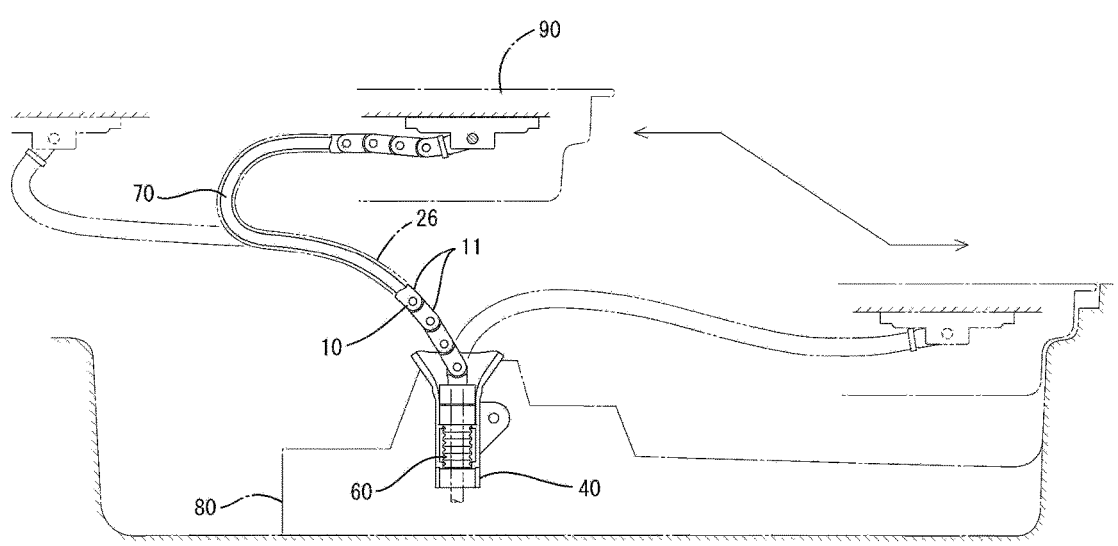
FIG. 8 is a plan view showing a state in which the electrical wire guide undergoes bending displacement in response to opening and closing of a slide door.

Hereinafter, a working example will be described with reference to FIGS. 1 to 8. As shown in FIG. 8, an electrical wire routing apparatus according to a working example is for protecting an electrical wire 70 routed between a vehicle body 80 of a car and a slide door 90 that is movable with respect to the vehicle body 80, and includes an electrical wire guide 10 into which an electrical wire 70 is inserted, a bracket 40 that is provided on and fixed to the vehicle body 80, and a stretchable elastic member 60 that connects the bracket 40 and the electrical wire guide 10. The electrical wire 70 is for electrically connecting an electric part (including a power source) of the vehicle body 80 and an electric part of the slide door 90 to each other. Note that in the following description, the vertical direction indicates the vertical direction of the vehicle body 80, referenced on the gravity direction. Also, the length direction indicates the length direction of the electrical wire 70, and is the same as a direction in which the electrical wire 70 is routed. Furthermore, regarding the length direction, the side of the vehicle body 80 is the side of one end, and the side of the slide door 90 is the side of the other end in the following description.

Figure 1:
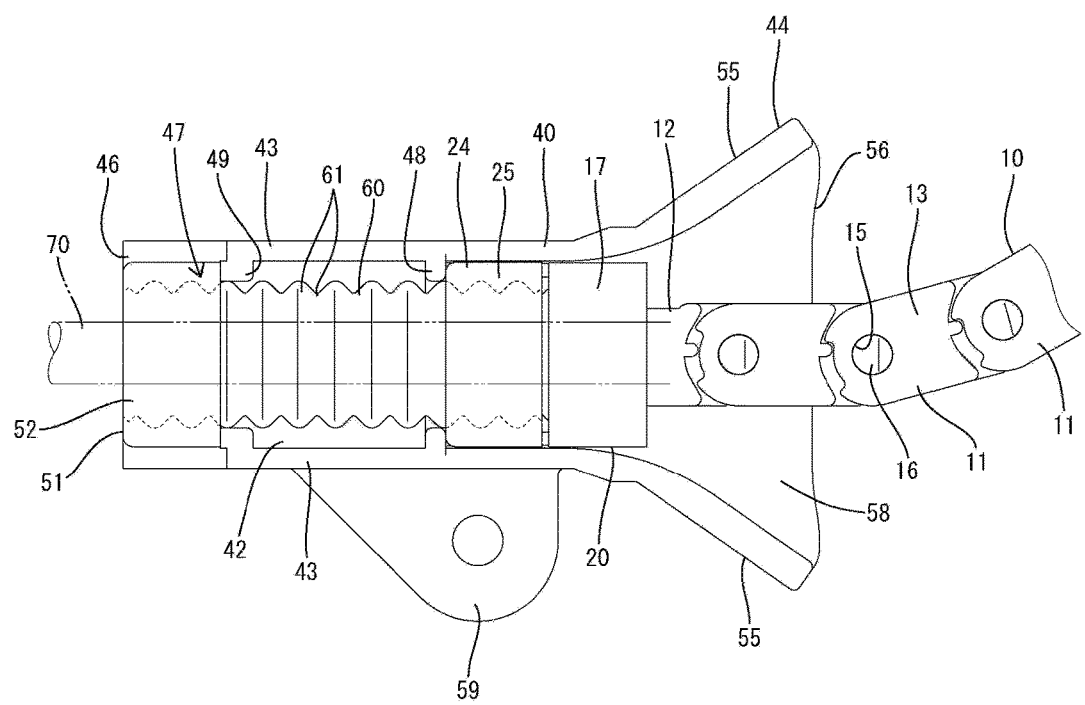
FIG. 1 is a plan view of main portions of an electrical wire routing apparatus according to a working example.
Figure 3:
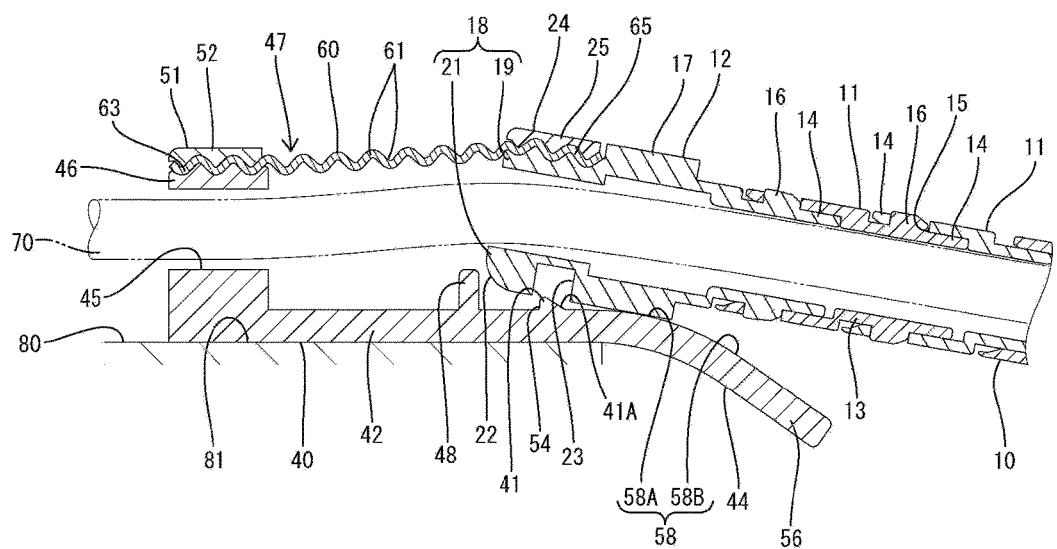
FIG. 3 is a cross-sectional view showing a state in which, when being trampled on, a terminal linking member is inclined along a guide surface of a bracket, an engagement protrusion and an engagement receiving portion are separated from each other, and the elastic member is stretched.

The electrical wire guide 10 extends in the length direction as a whole, is capable of undergoing bending displacement together with the electrical wire 70 in response to opening and closing of the slide door 90, and as shown in FIG. 1, is constituted by a plurality of linking members 11 that are disposed in the length direction. The linking members 11 are made of a synthetic resin and have the same shape except for a terminal linking member 12 that is linked to the bracket 40 via the elastic member 60. As shown in FIG. 3, the linking members 11 have an approximately rectangular tube-shaped main body 13 into which the electrical wire 70 is inserted. Also, linking members 11 that are adjacent in the length direction have protruding pieces 14 that overlap each other in the vertical direction, and are rotatably linked to each other by a protruding portion 16 of one linking member 11 fitting into a recessed portion 15 in the protruding piece 14 of another linking member 11.

As shown in FIG. 3, the terminal linking member 12 is constituted by an approximately tube-shaped terminal main body 17, linking portions 18 that protrude from upper and lower edges of one end of the terminal main body 17 toward one side, and the protruding pieces 14 that protrude from upper and lower edges of the other end of the terminal main body 17 toward the other side. It is provided with protruding portions 16 that protrude from the outer surface of the protruding pieces 14. The linking portion 18 is constituted by an upper piece 19 and a lower piece 21 that are disposed substantially in parallel to each other.

The lower piece 21 has a plate shape that covers the electrical wire 70 from below, and has a curved portion 22 that is continuous from the lower surface of the terminal main body 17 without a step and curves on the tip side. Also, an engagement receiving portion 23 is provided as an opening in the lower surface of the lower piece 21. The engagement receiving portion 23 is a recessed portion that has a bottom having a cross-sectionally angular U-shape. An engagement protrusion 41 of the bracket 40, which will be described later, can enter and be engaged with the engagement receiving portion 23.

The upper piece 19 has a plate shape that covers the electrical wire 70 from above, and its upper surface drops a step down from the upper surface of the terminal main body 17. The upper surface of the upper piece 19 is a wavy surface whose waviness repeats in the length direction in correspondence with an accordion shape (a stretchable portion 61 that is described later) of the elastic member 60.

A guide cover 24 made of a synthetic resin is attached to the terminal linking member 12. The guide cover 24 has a plate-shaped guide fixing portion 25 for holding another end 65 of the elastic member 60 between the guide fixing portion 25 and the upper surface of the upper piece 19. A lower surface of the guide fixing portion 25 is a wavy surface that is capable of being fitted to the upper surface of the upper piece 19 in correspondence with the accordion shape of the elastic member 60. Also, the guide cover 24 has two guide side portions (not shown) that are suspended from right and left side edges of the guide fixing portion 25, and is attached to the terminal linking member 12 such that the two guide side portions cover the upper piece 19 from the right and left sides. Note that the periphery of the linking members 11 including the terminal linking member 12 is covered by a rubber protecting tube 26 (see FIG. 8).

The elastic member 60 is a rubber member for maintaining a good elasticity, such as chloroprene rubber, ethylene-propylene rubber, or the like, and is stretchable in the length direction. Specifically, as shown in FIGS. 1 and 7, the elastic member 60 has a cross-sectionally portal shape, extends in the length direction, and is open to its lower side. An accordion-shaped stretchable portion 61 whose waviness repeats in the length direction is formed on approximately the entire outer surface of the elastic member 60. The end of the elastic member 60 is sandwiched between the upper piece 19 of the terminal linking member 12 and the guide fixing portion 25 of the guide cover 24. The stretchable portion 61 is engaged with (locked by) the upper surface of the upper piece 19 and the lower surface of the guide fixing portion 25, and thereby, the elastic member 60 is fixed to the electrical wire guide 10 without shifting with respect to the electrical wire guide 10.

The bracket 40 is made of a synthetic resin, and has a gutter shape extending in the length direction.

Figure 2:
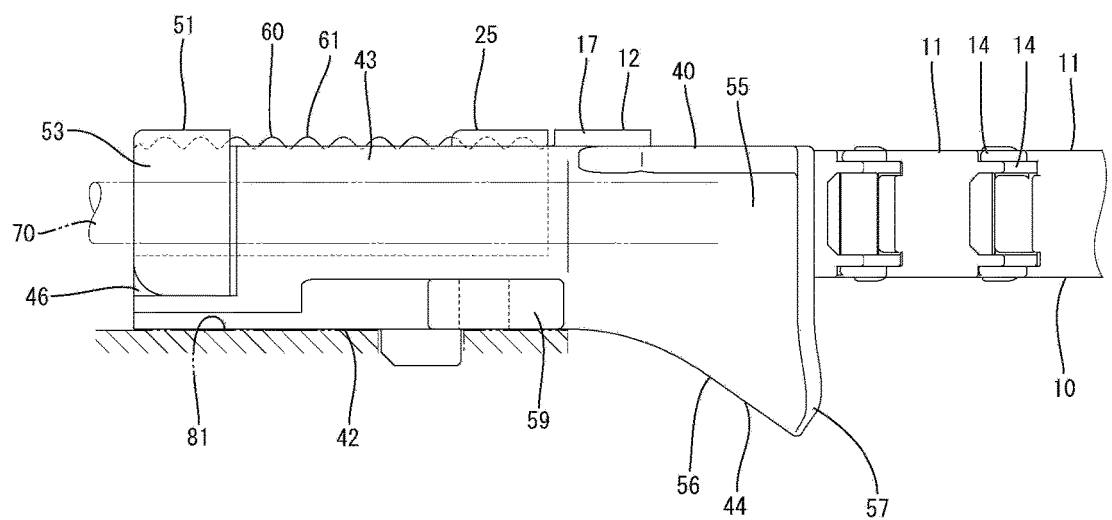
FIG. 2 is a side view of the main portions of the electrical wire routing apparatus.

As shown in FIGS. 1 and 2, the bracket 40 integrally has an approximately flat rectangular bottom plate 42, rising plates 43 that rise from the right and left side edges of the bottom plate 42, guide portions 44 that expand in the form of half a trumpet from two rising plates 43 and the other end of the bottom plate 42 toward its front end, and a lead-out portion 46 having a lead-out hole 45 (see FIG. 3) that is located on one end opposite to the guide portions 44 and into which the electrical wire 70 is inserted. The inside of the bracket 40 serves as an accommodation space 47 for accommodating a terminal portion of the electrical wire 70, the elastic member 60, the terminal linking member 12, and the guide cover 24. Also, an overhang portion 59 that laterally protrudes from one side edge of the bottom plate 42 is provided on the bracket 40. The overhang portion 59 is placed on an installation surface 81 of the vehicle body 80, and is fixed to the vehicle body 80 via a fixing means such as a bolt (not shown).

Figure 4:
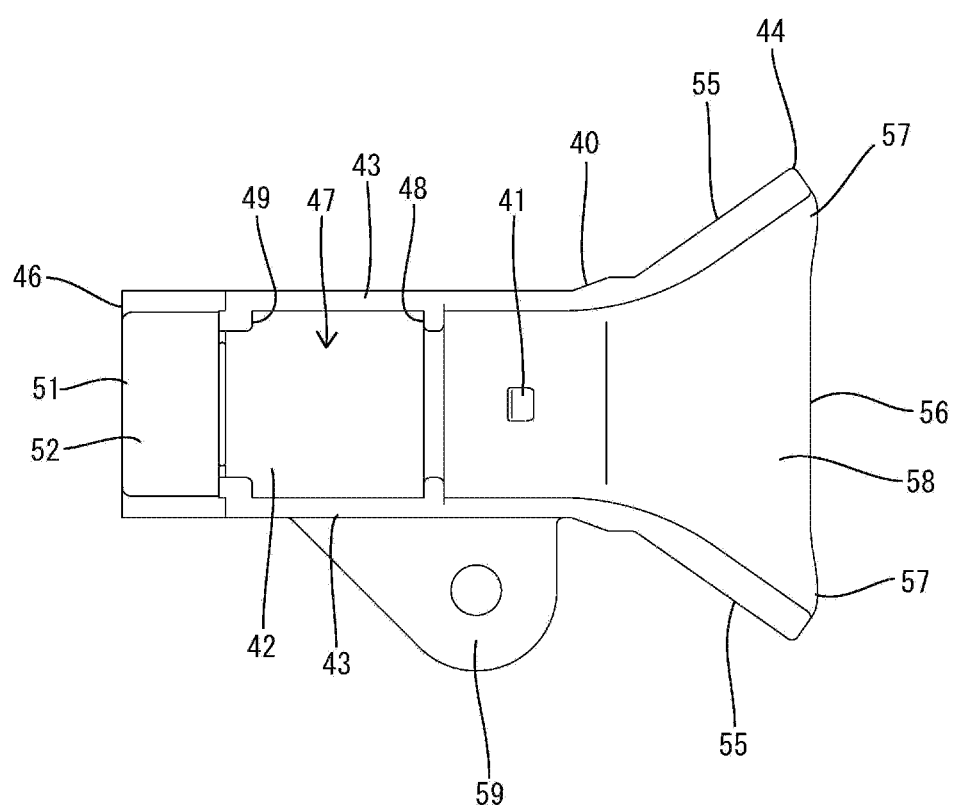
FIG. 4 is a plan view of the bracket to which a vehicle body side cover is attached.

As shown in FIGS. 1 and 4, guide stoppers 48 and vehicle body stoppers 49, extending in the form of ribs, are provided at an interval in the length direction from the bottom plate 42 to the two rising plates 43 on an inner surface of the bracket 40. The guide stoppers 48 are disposed at positions near the guide portions 44. The terminal linking member 12 and the guide cover 24 are disposed closer to the other end than the guide stopper 48 in the accommodation space 47, are biased by the elastic member 60 toward one end, and abut against the guide stopper 48. As a result of this, the terminal linking member 12 and the guide cover 24 are positioned.

The vehicle body stopper 49 is disposed at a position near the lead-out portion 46, and is integrated with the lead-out portion 46. As shown in FIG. 3, similarly to the upper surface of the upper piece 19, the upper surface of the lead-out portion 46 is a wavy surface whose waviness repeats in the length direction in correspondence with the stretchable portion 61 of the elastic member 60. A vehicle body cover 51 made of a synthetic resin is attached to the lead-out portion 46. The vehicle body cover 51 has a similar shape to that of the guide cover 24, and has a vehicle body fixing portion 52 whose lower surface is a wavy surface and two vehicle body side portions 53. When the vehicle body cover 51 is attached to the bracket 40, the two vehicle body side portions 53 cover the lead-out portion 46 from the left and right sides and are disposed and exposed at both side surfaces of the bracket 40 (see FIG. 2).

As shown in FIG. 3, one end 63 of the elastic member 60 is sandwiched and fixed between the lower surface of the vehicle body fixing portion 52 and the upper surface of the lead-out portion 46. The vehicle body cover 51 is biased by the elastic member 60 toward the other end and abuts against the vehicle body stopper 49. As a result of this, the vehicle body cover 51 is positioned. Here, the elastic member 60 is disposed and exposed above the region between the vehicle body stopper 49 and the guide stopper 48 in the accommodation space 47 of the bracket 40.

Claw-like engagement protrusions 41 are provided between the guide stoppers 48 and the guide portions 44 in left and right central portions of the inner surface (upper surface) of the bottom plate 42. The engagement protrusions 41 have a small size so that they can be loosely fitted into the engagement receiving portions 23, and their surfaces that face the guide stoppers 48 serve as engaging surfaces 54 extending in the vertical direction. Separation of the terminal linking member 12 from the bracket 40 is restricted by the engaging surface 54 of the engagement protrusion 41 abutting against the inner surface of the engagement receiving portion 23. Also, the engagement protrusion 41 has a slope portion 41A that is inclined with an upward gradient toward the engaging surface 54, on the other end opposite to the engaging surface 54.

Figure 5:
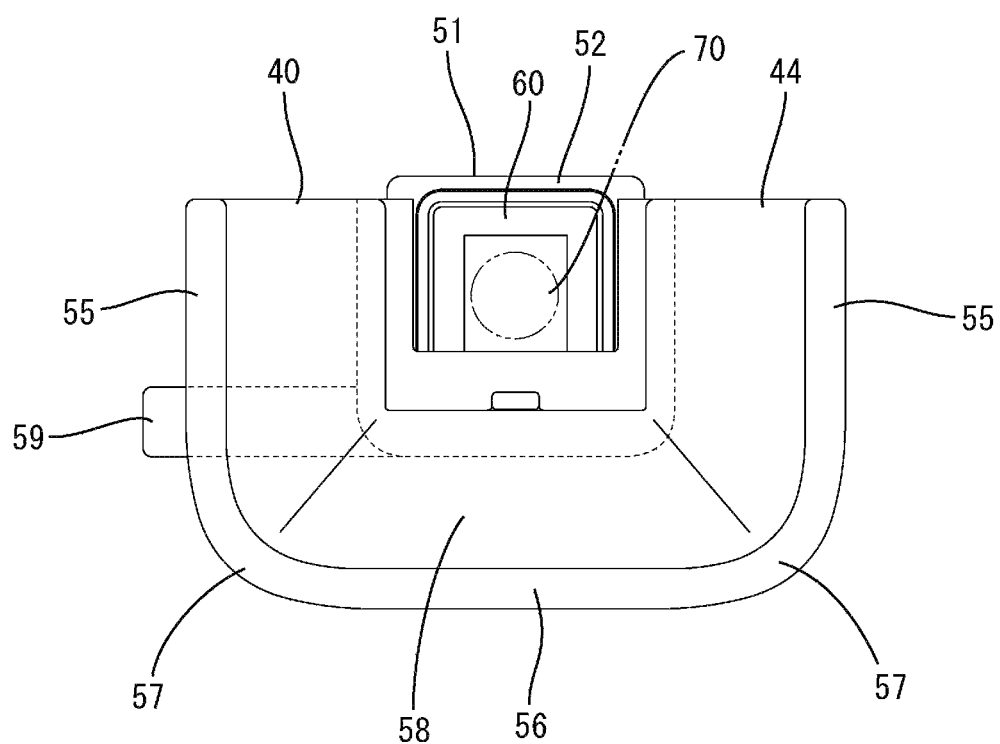
FIG. 5 is a front view of a bracket to which a vehicle body side cover is attached.
Figure 6:
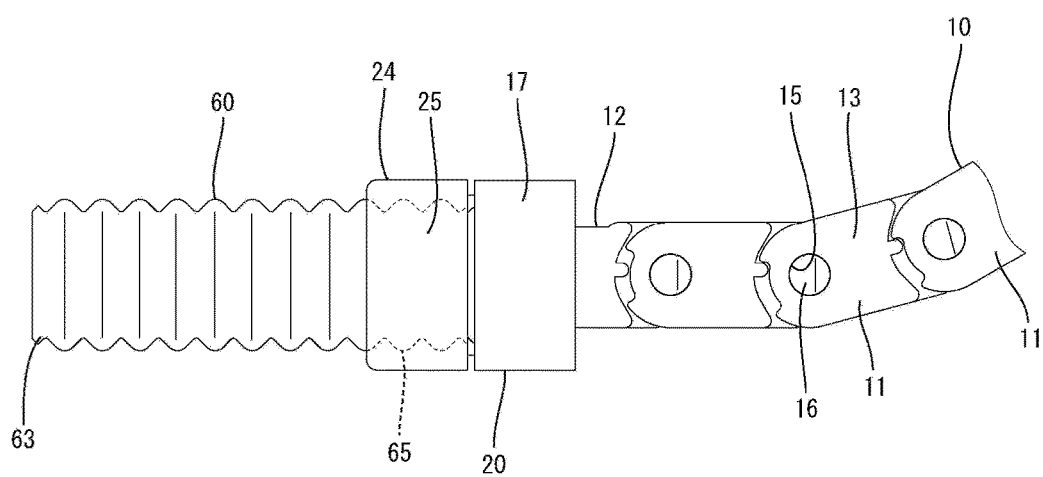
FIG. 6 is a plan view of a portion at which the terminal linking member and the elastic member are linked to each other.

As shown in FIGS. 2 and 5, the guide portions 44 are constituted by expansion portions 55 expanding to both sides that widen in a tapered shape from the other end of the two rising plates 43 to their front ends on the left and right sides, an inclined portion 56 that is inclined downwardly from the other end of the bottom plate 42 toward its front end, and linking portions 57 that connect the inclined portions 56 and the expansion portions 55 expanding on both sides in a curved shape. The linking portions 57 have a shape slightly protruding frontward from the expansion portions 55 expanding on both sides and the inclined portion 56.

The inner surface of the inclined portion 56 serves as a guide surface 58 for guiding a displacement motion of the terminal linking member 12 by sliding of the terminal main body 17 of the terminal linking member 12. As shown in FIG. 3, the guide surface 58 of the inclined portion 56 is constituted by a curved surface portion 58A that drops from a site at which the engagement protrusion 41 is disposed on the inner surface of the bottom plate 42 to its front end, and a straight surface portion 58B that is continuous with and linearly drops from the curved surface portion 58A to its front end. The guide surface 58 of the inclined portion 56 is formed in such a range that the guide surface 58 can support the terminal linking member 12 even in a state in which the elastic member 60 has stretched to the maximum.

Next, some of the functional effects of this working example will be described.

During assembly, the electrical wire 70 inserted into the linking members 11 is led out from one end of the terminal linking member 12, the led out electrical wire 70 is covered from above with the elastic member 60, and the other end 65 of the elastic member 60 is placed on the upper piece 19 of the terminal linking member 12. Next, the other end 65 of the elastic member 60 is covered from above with the guide fixing portion 25 of the guide cover 24, and the other end 65 of the elastic member 60 is sandwiched and fixed between the guide cover 24 and the upper piece 19. Accordingly, a unit 20, shown in FIG. 6, in which the elastic member 60 is linked to the terminal linking member 12, is obtained. Note that at this time, the terminal portion of the electrical wire 70 is in a state in which the front end of the terminal portion has passed through the lead-out hole 45 of the lead-out portion 46.

Subsequently, the unit 20 is inserted into the accommodation space 47 of the bracket 40 from above, the engagement protrusions 41 of the bracket 40 are inserted into the engagement receiving portions 23 of the terminal linking member 12 so as to be capable of being engaged with (locked by) the engagement receiving portions 23, and thereby the terminal linking member 12 is supported by the bracket 40 in a state in which the terminal linking member 12 is positioned in the length direction. The upper surface of the lead-out portion 46 in this state is covered with the one end 63 of the elastic member 60, and the one end 63 of the elastic member 60 is covered from above with the vehicle body fixing portion 52 of the vehicle body cover 51. Accordingly, the one end 63 of the elastic member 60 is sandwiched and fixed between the vehicle body cover 51 and the lead-out portion 46 (see FIG. 3). The one end 63 of the elastic member 60 is fixed to the lead-out portion 46, and the other end 65 is held at positions near the guide portions 44 due to engagement between the engagement protrusions 41 and the engagement receiving portions 23, maintaining the elastic member 60 in a state that has shrunk towards the natural state. Also, the bracket 40 is fixed to the installation surface 81 of the vehicle body 80 by the overhang portion 59 at an appropriate time.

At the time of usage, when the slide door 90 is opened or closed, the electrical wire 70 bends approximately in an S shape in accordance with the motion of the slide door 90, the linking members 11 rotate against each other, and the electrical wire guide 10 undergoes bending displacement as a whole, allowing a bending motion of the electrical wire 70 (see FIG. 8). At this time, because the engagement protrusions 41 of the terminal linking member 12 are disposed in the engagement receiving portions 23 of the bracket 40 so as to be capable of being engaged with the engagement receiving portions 23, the terminal linking member 12 is not displaced with respect to the bracket 40 (positional shift), and the elastic member 60 is maintained in a state that has shrunk towards the natural state. Also, when the linking members 11 rotate in accordance with the motion of the slide door 90, if the linking member 11 that is linked to the terminal linking member 12 is displaced in the left-right direction, the displaced linking member 11 is located inside the expansion portions 55 expanding on both sides of the guide portions 44, avoiding interference with the bracket 40.

When the slide door 90 is open, one end of the electrical wire guide 10 is exposed near the step portion of an entrance door, and a passenger may easily trample on the one end of this electrical wire guide 10. There is a concern that if the one end of the electrical wire guide 10 is trampled on, the trampled site will be displaced downwardly, and the electrical wire guide 10 will be damaged.

However, in the case of this working example, when the electrical wire guide 10 is trampled on, the terminal linking member 12 is inclined downwardly in a direction in which the electrical wire guide 10 is trampled on, accordingly, the engagement receiving portions 23 are separated from the engagement protrusions 41, and the engagement comes off (see FIG. 3). Furthermore, the lower surface of the terminal main body 17 of the terminal linking member 12 slides obliquely downward from the curved surface portion 58A toward the straight surface portion 58B along the guide surface 58 of the inclined portion 56, and the elastic member 60 whose other end 65 is held by the terminal linking member 12 has stretched in the length direction. Therefore, stress is relaxed due to elongation of the elastic member 60, and no excessive stress is applied to the electrical wire guide 10.

Thereafter, when the trampling stops, the terminal linking member 12 is biased toward the one end due to the elastic restoring force of the elastic member 60, sliding the guide surface 58 obliquely upward, and can automatically return to the original position again. When returning to the original position, the terminal linking member 12 moves from the guide portions 44 to the bottom plate 42, and the engagement protrusions 41 enter the engagement receiving portions 23 due to the terminal linking member 12 returning to the original horizontal orientation, resulting in a state in which the engagement protrusions 41 are capable of being engaged with the engagement receiving portions 23 again. Thus, after stopping the trampling, the elastic member 60 is maintained in a state that has shrunk towards the natural state.

In the above description, because the curved portion 22 of the lower piece 21 and the other ends of the engagement protrusions 41 have a sloped shape, even if the terminal linking member 12 is pulled downward by the electrical wire guide 10 being excessively trampled on, the curved portion 22 smoothly slides the slope portions 41A of the engagement protrusions 41, and when the terminal linking member 12 returns to the original position due to elastic restoring force resulting from the stop of trampling, the terminal linking member 12 can smoothly return automatically to the original position.

As described above, according to this working example, it is possible to avoid the concentration of stress in a portion of the electrical wire guide 10 due to stretching of the elastic member 60 when the electrical wire guide 10 is trampled on, and to prevent the electrical wire guide 10 from being damaged. Also, when the trampling stops, the electrical wire guide 10 can automatically return to the original state due to the electrical wire guide 10 being guided by the bracket 40 while receiving an elastic restoring force of the elastic member 60, and thus the reliability of a returning motion can be increased. In particular, since the elastic member 60 is a rubber member that covers the electrical wire 70, the material and the shape of the elastic member 60 can be selected flexibly, and thus the stability of stretching and shrinking motions of the elastic member 60 can be ensured.

Also, since the bracket 40 is provided on the vehicle body 80, the one end 63 of the elastic member 60 is linked to the bracket 40, and the other end 65 of the elastic member 60 is linked to the terminal linking member 12 of the electrical wire guide 10, the elastic member 60 is effectively installed at a location near the vehicle body 80 that is likely to be trampled on, and thus an excessive stress is unlikely to be applied to the electrical wire guide 10.

Moreover, the guide surface 58 that is inclined downwardly from the vehicle body 80 to the slide door 90 is provided on the bracket 40, and when the electrical wire guide 10 is trampled on, the terminal linking member 12 can be supported in a state in which the terminal linking member 12 is inclined along the guide surface 58. Therefore, a smooth displacement motion of the electrical wire guide 10 is ensured.

Furthermore, the engagement protrusions 41 are provided on the bracket 40, the engagement receiving portions 23 are provided on the terminal linking member 12, and the elastic member 60 is always maintained in a relatively shrunk state due to engagement between the engagement protrusions 41 and the engagement receiving portions 23, whereas the engagement between the engagement protrusions 41 and the engagement receiving portions 23 is released due to inclination of the terminal linking member 12 along the guide surface 58, and the elastic member 60 is in a relatively stretched state, and thus the elastic member 60 stretches when being trampled on, and the elastic member 60 can be favorably maintained in a shrunk state at all times.

Hereinafter, other working examples will be described briefly.

Although the elastic member is stretchably installed between the electrical wire guide and the vehicle body in the above-described working example, in the case of the present design, the elastic member may be stretchably installed between the electrical wire guide and the slide door, or may be installed partway in the length direction of the electrical wire guide, that is, it may be stretchably installed between linking members arranged in the length direction.

Although the electrical wire is connected to an electric part of the slide door in the above-described working example, in the case of the present design, the electrical wire may be connected to an electric part of a slide sheet. In short, it is sufficient that the electrical wire may be routed between the vehicle body of a car and a movable body that is movable with respect to the vehicle body.

The elastic member may be provided integrally with a protecting tube for covering the periphery of the linking members.

The elastic member may have a cylindrical or tubular shape that is closed in its circumferential direction.

The elastic member is not limited to a rubber member, and may be a spring member such as a coil spring, for example.

In contrast to the above-described working example, the engagement protrusion may be provided on the terminal linking member, and the engagement receiving portion may be provided on the bracket.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electrical wire routing apparatus, comprising:
   an electrical wire guide into which an electrical wire to be routed between a vehicle body and a movable body that is movable with respect to the vehicle body is insertable, the electrical wire guide is configured to undergo bending displacement in accordance with a motion of the movable body;
   a terminal linking member into which the electrical wire is insertable, the terminal linking member is connected to the electrical wire guide and has at least one of an engagement receiving portion or an engagement protrusion;
   a bracket in which the electrical wire guide and the terminal linking member are displaceable with respect to the bracket, the bracket is configured for fixed attachment to the vehicle body or the movable body and has the other of the engagement receiving portion or the engagement protrusion; and
   a stretchable elastic member installed between the terminal linking member and the bracket;
   during a displacement motion, the elastic member stretches between the terminal linking member and the bracket, the engagement receiving portion and the engagement protrusion release mutual engagement, and the bracket guides a displacement motion of the electrical wire guide; and
   during a return motion opposite the displacement motion, the elastic member shrinks between the terminal linking member and the bracket, the engagement receiving portion and the engagement protrusion establish mutual engagement, and the bracket guides a return motion of the electrical wire guide.

2. The electrical wire routing apparatus according to claim 1, wherein the elastic member is a rubber member for covering the electrical wire.

3. The electrical wire routing apparatus according to claim 1, wherein the bracket is provided on the vehicle body or the movable body, one end of the elastic member is linked to the bracket, and another end of the elastic member is linked to the terminal linking member provided at an end of the electrical wire guide.

4. The electrical wire routing apparatus according to claim 3, wherein a guide surface is provided on the bracket, the guide surface being inclined downwardly, with respect to the vehicle body, from the vehicle body or the movable body and being capable of supporting the terminal linking member inclined downwardly with respect to the vehicle body.

5. The electrical wire routing apparatus according to claim 4,
   with respect to the vehicle body, the engagement protrusion and the engagement receiving portion are configured to be always engaged with each other and keep the elastic member in a shrunk state, whereas the engagement protrusion and the engagement receiving portion are configured to release mutual engagement due to the terminal linking member being inclined along the guide surface and keep the elastic member in a stretched state.

6. The electrical wire routing apparatus according to claim 5, wherein the terminal linking member and the engagement protrusion have slope portions that slide mutually when the terminal linking member is inclined along the guide surface.

* * * * *